Patented Aug. 8, 1933

1,921,007

UNITED STATES PATENT OFFICE 1,921,007

RUBBER COMPOSITION AND METHOD OF PRESERVING RUBBER

Waldo L. Semon, Cuyahoga Falls, Ohio, assignor to The B. F. Goodrich Company, New York, N. Y., a Corporation of New York No Drawing. Application May 20, 1929
Serial No. 364,694

20 Claims. (Cl. 18—50)

This invention relates to the art of preserving rubber, either in the vulcanized or unvulcanized condition, and to rubber compositions so preserved.

It is well known that rubber is subject to more or less rapid deterioration upon aging, especially when exposed to light, heat, or air. It has been proposed to treat rubber with so-called "anti-oxidants" for the purpose of retarding its deterioration and extending the period of its usefulness. Such previously known anti-oxidants include phenolic compounds, aromatic amino compounds, and the condensation products of aldehydes and amines.

This invention consists in treating rubber with a member of a new class of extremely effective anti-oxidants. This class comprises the addition products of certain non-accelerating organic amines with hydroxy derivatives of benzene, and particularly the addition products of secondary aromatic amines with poly-hydroxy benzene derivatives. Such products are readily prepared by combining the amine and the hydroxy compound in equimolecular proportions or in multiples thereof, either by melting the two constituents together, or by dissolving them separately in an appropriate solvent, mixing the solutions and eliminating the solvent. The addition products, however, should not be confused with the condensation products made from the same raw materials with the elimination of water. The addition products, although they appear to be stable molecular compounds of definite composition, contain all the elements of the constituents, and resemble inorganic salts in that they are more or less readily dissociated into their constituents, in marked contradistinction to the condensation products, which possess fewer atoms than the raw materials, and are comparatively inert and unreactive, not permitting a separation into the original constituents. It is to be understood, however, that it is not intended to limit this invention by any theories which may herein be advanced by way of explanation or illustration, but that it is intended that the term "addition products" include generally all products obtained by combining phenols with amines without the elimination of water.

The non-accelerating organic amines which constitute one of the components of the aforesaid addition products include such products as diaryl amines; non-accelerating heterocyclic amines; and non-accelerating condensation products of aldehydes and amines, all of which exhibit the characteristic properties and reactions of secondary amines, etc. For example, any one of the following organic amines, which are substantially non-accelerators of vulcanization, may be the basic constituent of an anti-oxidant addition product: diphenylamine, phenyl-beta-naphthylamine, phenyl-alpha-naphthylamine, phenyl-p-toluidine, phenyl-p-anisidine, ditolylamine, symmetrical diphenyl-p-phenylene-diamine, symmetrical di-beta-naphthyl-p-phenylene-diamine, dinaphthylamine, methyl-alpha-naphthylamine, butyl-alpha-naphthylamine, diphenyl-ethylene-diamine, ditolyl-ethylene-diamine, p-methylamino-diphenylamine, p-hydroxy-diphenylamine, carbazole, thiodiphenylamine, aldol-alpha-naphthylamine, butyraldehyde-alpha-naphthylamine, acetaldehyde-p-aminodiphenylamine.

The other ingredient, the phenolic compound, which is to be mixed with one of the foregoing non-accelerating amines to form the addition product, is preferably selected from the poly-hydroxy benzenes such as hydroquinone, resorcinol, pyrocatechol, pyrogallol, phloroglucinol, or substituted derivatives thereof, such as toluhydroquinone, chlor-hydroquinone, etc., but the monohydroxy phenols such as ordinary phenol, cresol, guaiacol, etc. may also be employed and give rise to products which are valuable anti-oxidants, although not quite as active as those prepared from the poly-hydroxy benzene derivatives.

The addition products of the non-accelerating organic amines and the hydroxy derivatives of benzene are themselves non-accelerators of vulcanization. This property is exceedingly important in the practical utilization of the anti-oxidants, since it permits the addition of such anti-oxidants ad libitum, or permits changing the proportions employed in any rubber composition to conform to the requirements established by its particular use, without making necessary any change in the proportions of the various vulcanizing agents, accelerators, etc. or in the time or conditions of vulcanization. The addition products are practically odorless and do not impart an undesirable odor to rubber compositions. They show little or no tendency to discolor or stain the rubber, either before or after vulcanization.

Rubber or rubber compositions may be rendered extremely resistant to deterioration by incorporating therein a small proportion of one of the above-mentioned addition products, preferably in the proportion of from 1/10 to 5 parts by weight being added to each 100 parts of rubber. Rubber so treated withstands oxidation or exposure to sunlight or the elements for a far longer period than similar untreated rubber, without sensible deterioration.

*Example 1.*—As a specific example of one embodiment of the method of this invention, a typical tire tread composition was prepared containing: blended plantation rubber 100 parts by weight, sulfur 5.5 parts, zinc oxide 30 parts, gas black 40 parts, mineral rubber 10 parts, palm oil 5 parts, and hexamethylene tetramine 0.75 parts. This was divided into two portions, one of which was used as a control. To the other was added 0.95 parts (0.5% of the weight of the composition) of the anti-oxidant prepared by mixing equimolecular proportions of phenyl-beta-naphthylamine and pyrogallol. The compositions were throughly mixed, and vulcanized in a press for 45 minutes at 145° C. (290° F.) to produce an optimum cure. The relative rates of aging of the vulcanized compositions were compared by measuring their respective tensile strengths and elongations before and after aging. Accelerated aging tests were carried out in the Geer aging oven, in which samples were maintained at a temperature of 70° C. (158° F.) in a constantly renewed stream of air, as well as in the Bierer-Davis bomb, in which other samples were maintained at the same temperature (70° C.) in an atmosphere of oxygen at a pressure of 300 lbs. per sq. in. In the table below T indicates ultimate tensile strength in pounds per sq. in. and E indicates ultimate elongation in per cent. of original length.

*Aging tests of phenyl-beta-naphthylamine-pyrogallol*

| Anti-oxidant (0.5%) | Before aging | | After 7 days in the Geer oven | | After 48 hours in the Bierer-Davis bomb | |
| --- | --- | --- | --- | --- | --- | --- |
| | T | E | T | E | T | E |
| None (control) | 3579 | 747 | 2224 | 455 | 1077 | 350 |
| Phenyl-beta-naphthylamine pyrogallol | 3707 | 795 | 3007 | 588 | 2721 | 553 |

It is evident tht the composition containing the anti-oxidant retains its good physical properties to a far greater extent that the composition without anti-oxidant, even after a very severe artificial aging test.

*Example 2.*—A number of anti-oxidants were prepared by combining hydroquinone with various non-accelerating amines in the ratios indicated:

A. hydroquinone (1 mol) and diphenylamine (2 mols).

B. hydroquinone (1 mol) and phenyl-alpha-naphthylamine (2 mols).

C. hydroquinone (1 mol) and phenyl-beta-naphthylamine (2 mols).

D. hydroquinone (1 mol) and diphenyl-ethylene-diamine (1 mol).

E. hydroquinone (1 mol) and butylidene-alpha-naphthylamine (2 mols), and

F. hydroquinone (1 mol) and aldol-alpha-naphthylamine (2 mols).

These anti-oxidants were tested in the manner indicated in Example 1 above, the results being reported in the following table:

*Aging tests of hydroquinone addition products*

| Anti-oxidant (0.5%) | Before aging | | After 7 days in the Geer oven | | After 48 hours in the Bierer-Davis bomb | |
| --- | --- | --- | --- | --- | --- | --- |
| | T | E | T | E | T | E |
| None (control) | 3607 | 675 | 1976 | 493 | 861 | 310 |
| A | 3769 | 687 | 2381 | 563 | 2356 | 573 |
| B | 3712 | 693 | 3070 | 617 | 2927 | 560 |
| C | 3773 | 703 | 2947 | 583 | 3147 | 577 |
| D | 3667 | 697 | 2472 | 540 | 1950 | 520 |
| E | 3752 | 723 | 2909 | 570 | 2746 | 555 |
| F | 3544 | 693 | 2655 | 517 | 2577 | 533 |

From these examples it is evident that the addition products of phenols and non-accelerating amines are extremely effective in retarding the deleterious action normally incident to the aging of rubber.

Obviously, the practice of this invention is not limited to the specific compositions given above, such compositions being merely illustrative of one manner of employing the anti-oxidants of this invention. The proportions of the constituents may be varied, or other substances may be substituted therefor, since this invention is applicable to pure rubber or rubber compositions of the most varied nature. The anti-oxidants may also be applied to unvulcanized or vulcanized rubber with good effect on the age-resisting properties of the rubber, such as by applying them to the surface of the rubber, as for example in solution, or in the form of a paste or emulsion.

It is well known that nitrogenous materials having a basic reaction such as amines, amides, hydrazines, etc., although not themselves endowed with marked accelerating properties, possess the property of activating certain commercial accelerators, especially sulfur-containing accelerators. Therefore, I do not intend to limit my definition of non-accelerating products to include only substances which have no effect upon the rate of vulcanization of rubber compositions containing accelerators activated by nitrogenous bases, but only to limit it to such substances as have substantially no effect upon the vulcanization of compositions not containing such accelerators. For example, if one of the addition products of this invention is incorporated into a non-accelerated, sulfur-containing rubber composition, a useful vulcanized rubber product is not obtained, even after vulcanizing for an hour at 300° F. Therefore this product is considered substantially a non-accelerator of vulcanization, in spite of the fact that it is capable of almost doubling the rate of vulcanization of a composition containing tetramethyl-thiuramdisulfide.

It is to be understood that the term "treating" as employed in the appended claims is used in a generic sense to include either the incorporation of the anti-oxidants into the rubber by milling or similar process, or their addition to the rubber latex before its coagulation, or to the application thereof to the surface of a mass of crude or vulcanized rubber. The term "rubber" is likewise employed in the claims in a generic sense to include caoutchouc, whether or not admixed with fillers, pigments, vulcanizing or accelerating agents. The term "amine" is herein employed to refer only to compounds in which each basic nitrogen atom is attached by single bonds to hydrogen atoms and/or to carbon atoms which in turn are attached only to further hydrogen or carbon atoms, and therefore excludes such compounds as amides and amidines.

While I have herein disclosed certain preferred manners of performing my invention, I do not thereby desire or intend to limit myself solely thereto, for, as hitherto stated, the precise proportions of the materials utilized may be varied and other materials having equivalent chemical properties may be employed if desired without departing from the spirit and scope of the invention as defined in the appended claims.

I claim:

1. The method of preserving rubber which comprises treating rubber with the addition product of a phenol and a non-accelerating secondary aromatic amine.

2. The method of preserving rubber which comprises treating rubber with the addition product of a poly-hydroxy benzene derivative and a non-accelerating secondary aromatic amine.

3. The method of preserving rubber which comprises treating rubber with the addition product of a poly-hydroxy benzene derivative and a secondary aryl-amine.

4. The method of preserving rubber which comprises treating rubber with the addition product of a di-hydroxy benzene derivative and a secondary aryl-amine.

5. The method of preserving rubber which comprises treating rubber with the addition product of hydroquinone and a secondary aryl-amine.

6. The method of preserving rubber which comprises treating rubber with the addition product of hydroquinone and a diarylamine.

7. The method of preserving rubber which comprises treating rubber with the addition product of hydroquinone and phenyl-beta-naphthylamine.

8. A composition of matter comprising rubber and the addition product of a phenol and a non-accelerating secondary aromatic amine.

9. A composition of matter comprising rubber and the addition product of a poly-hydroxy benzene derivative and a non-accelerating secondary aromatic amine.

10. A composition of matter comprising rubber and the addition product of a poly-hydroxy benzene derivative and a secondary aryl-amine.

11. A composition of matter comprising rubber and the addition product of a di-hydroxy benzene derivative and a secondary aryl-amine.

12. A composition of matter comprising rubber and the addition product of hydroquinone and a secondary aryl-amine.

13. A composition of matter comprising rubber and the addition product of hydroquinone and a diarylamine.

14. A composition of matter comprising rubber and the addition product of hydroquinone and phenyl-beta-naphthylamine.

15. A vulcanized rubber product resulting from the vulcanization of a composition comprising rubber, a vulcanizing agent, an accelerator of vulcanization, and the addition product of a phenol and a non-accelerating secondary aromatic amine.

16. A vulcanized rubber product resulting from the vulcanization of a composition comprising rubber, a vulcanizing agent, an accelerator of vulcanization, and the addition product of a poly-hydroxy benzene derivative and a non-accelerating secondary aryl-amine.

17. A vulcanized rubber product resulting from the vulcanization of a composition comprising rubber, a vulcanizing agent, an accelerator of vulcanization, and the addition product of a poly-hydroxy benzene derivative and a diarylamine.

18. A vulcanized rubber product resulting from the vulcanization of a composition comprising rubber, a vulcanizing agent, an accelerator of vulcanization, and the addition product of hydroquinone and a diarylamine.

19. The method of preserving rubber which comprises treating rubber with the addition product of a poly-hydroxy phenol and a diarylamine.

20. A composition of matter comprising rubber and the addition product of a poly-hydroxy phenol and a diarylamine.

WALDO L. SEMON.